United States Patent
Liao

(10) Patent No.: US 10,648,493 B1
(45) Date of Patent: May 12, 2020

(54) CLAMPING BRACKET

(71) Applicant: Guangdong Gopod Group Co., Ltd., Shenzhen/Guangdong (CN)

(72) Inventor: Zhuowen Liao, Shenzhen (CN)

(73) Assignee: GUANGDONG GOPOD GROUP HOLDING CO., LTD., Shenzhen (CN)

( * ) Notice: Subject to any disclaimer, the term of this patent is extended or adjusted under 35 U.S.C. 154(b) by 0 days.

(21) Appl. No.: 16/407,351

(22) Filed: May 9, 2019

Related U.S. Application Data

(63) Continuation of application No. PCT/CN2019/074206, filed on Jan. 31, 2019.

(51) Int. Cl.
  *F16B 2/12* (2006.01)
  *F16H 19/04* (2006.01)

(52) U.S. Cl.
  CPC ............. *F16B 2/12* (2013.01); *F16H 19/04* (2013.01)

(58) Field of Classification Search
  CPC .................................. F16B 2/12; F16H 19/04
  See application file for complete search history.

(56) References Cited

U.S. PATENT DOCUMENTS

| | | | | |
|---|---|---|---|---|
| 5,555,302 A | * | 9/1996 | Wang ................ | B60R 11/0241 379/426 |
| 5,836,563 A | * | 11/1998 | Hsin-Yung ......... | B60R 11/0241 248/316.4 |
| 7,272,984 B2 | * | 9/2007 | Fan .................... | B60R 11/02 248/231.61 |
| 7,407,143 B1 | * | 8/2008 | Chen ................. | B60R 11/0241 248/309.1 |
| 7,537,190 B2 | * | 5/2009 | Fan .................... | B60R 11/02 248/309.1 |
| 8,777,173 B2 | * | 7/2014 | Nemoto ............. | B60R 11/02 224/929 |
| 9,334,679 B2 | * | 5/2016 | Lin .................... | F16M 13/02 |
| 9,969,450 B1 | * | 5/2018 | Lu ...................... | B62J 11/00 |
| 2016/0325693 A1 | * | 11/2016 | Kim ................... | B60R 11/02 |

* cited by examiner

*Primary Examiner* — Anita M King
(74) *Attorney, Agent, or Firm* — Dorsey & Whitney LLP

(57) ABSTRACT

A clamping bracket includes base casing, clamping mechanism, controlling mechanism, and anchor mechanism. Clamping mechanism includes first and second clamping members. Controlling mechanism includes a first sliding member being connected to the first clamping member and being slidingly connected to the base casing, and a transmission member being connected to the base casing. Through the transmission member's own movement, transmission member drives the first clamping member to move toward or away from the second clamping member. Anchor mechanism includes a first anchor member that connects to the transmission member and a second anchor member that connects to the base casing. The first anchor member is in an unlock state when separating from the second anchor member and in a lock state when engaging with the second anchor member. Anchor mechanism allows the variable distance between the first clamping member and the second clamping member for holding different mobile devices.

16 Claims, 2 Drawing Sheets

CLAMPING BRACKET

CROSS-REFERENCE TO RELATED APPLICATIONS

This application is a continuation application of a co-pending PCT/CN2019/074206 filed Jan. 31, 2019, the disclosure of which is hereby incorporated by reference in its entirety.

FIELD

The invention generally relates to the field of mobile phone holders and, more particularly to a clamping bracket.

BACKGROUND

There are many kinds of existing holding stands for mobile phones and other mobile devices. Most of them are of grip style that require one hand for holding the mobile device, the other hand for opening the holding stand. Both hands need to coordinate to put the mobile device in between the holding arms of the holding stand. Then the hands release to allow a tight grip for the mobile device. It causes tremendous inconvenience while controlling or performing other tasks with only one free hand.

BRIEF SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

The purpose of the invention is to provide a clamping bracket for holding mobile devices. The invention is to solve the technical problem of the prior art mobile holding stands, for example, not designed to be operated with single hand.

According to one aspect, a clamping bracket for holding mobile devices includes:

a base casing;

a clamping mechanism including first and second clamping members located on opposite sides of the base casing with the first and the second clamping members sticking out from the respective sides of the base casing;

a controlling mechanism including a first sliding member connected to the first clamping member and slidingly connected to the base casing, and a transmission member connected to the base casing; and through the transmission member's own movement, the transmission member drives the first sliding member causing the first clamping member to move toward the second clamping member for gripping a mobile device, or to move away from the second clamping member for releasing the mobile device; and an anchor mechanism including a first anchor member connected to the transmission member and a second anchor member connected to the base casing, the first anchor member being in an unlock state when separating from the second anchor member, and the first anchor member being in a lock state when engaging with the second anchor member, the second anchor member containing a plurality of plug-in positions for the first anchor member to engage with; whereby the first anchor member, when switching from the lock state to the unlock state, disengages from a current plug-in position to drive the transmission member to move the first clamping member, and whereby the first anchor member, when switching from the unlock state to the lock state, becomes immobile thereby causing the transmission member to stop the first clamping member.

According to another aspect, the controlling mechanism further comprises a second sliding member connected to the second clamping member and slidingly connected to the base casing. Through the transmission member's own movement, the transmission member drives the second sliding member causing the second clamping member to move toward or away from the first clamping member.

According to yet another aspect, the transmission member includes a big gear rotatably connected to the base casing, and a first clamping gear rack located on one side of the first sliding member contains gear teeth meshed with the big gear.

According to yet another aspect, a second clamping gear rack located on one side of the second sliding member contains gear teeth meshed with the big gear, and the first clamping gear rack and the second clamping gear rack are correspondingly set up such that the big gear located therebetween is configured for moving the first clamping gear rack and the second clamping gear rack in opposite directions.

According to yet another aspect, the anchor mechanism further comprises an elastomer and a connector connected to the transmission member, the elastomer being connected to the connector in one end and connected to the first anchor member in other end, such that the first anchor member is switched from the lock state to the unlock state during an elastic expansion of the elastomer, and the first anchor member is switched from the unlock state to the lock state during and an elastic recovery of the elastomer from the elastic expansion.

According to yet another aspect, the first anchor member comprises a first anchor gear rack and a first anchor block connected to the elastomer and, the second anchor member comprises a second anchor gear rack having gear teeth meshed with the first anchor gear rack.

According to yet another aspect, the first anchor block is connected to the base casing with a sleeve joint and is configured for moving toward or away from the elastomer.

According to yet another aspect, the first anchor block includes an anti-slip mechanism for slippery prevention.

According to yet another aspect, the base casing comprises a top panel, a bottom panel, and a side panel for connecting the top panel and the bottom panel. The top panel, the bottom panel, and the side panel together forming a cavity. The transmission member is located inside the cavity. The side panel has a pair of sliding member slots that correspond to each other, and an anchor member control slot located between the sliding member slots. The first sliding member and the second sliding member are configured for piercing through the respective sliding member slots. The first anchor member is configured for piercing through the anchor member control slot, and for sliding along the anchor member control slot under the unlock state.

According to yet another aspect, the first anchor gear rack has a first joining surface for engaging with the second anchor gear rack, and the second anchor gear rack has the second joining surface for engaging with the first anchor gear rack. The second anchor gear rack is connected to the side panel toward the cavity with the second joining surface facing inside, and the first anchor gear rack is convexly located on one side of the first anchor member with the first joining surface facing the second anchor gear rack.

According to yet another aspect, the clamping bracket further includes a first torsion spring connected to the first sliding member, and the first clamping member is rotatably connected to the first sliding member. The first torsion spring connects to the first sliding member in one end and connects to the first clamping member in the other end.

According to yet another aspect, the clamping bracket further includes a second torsion spring connected to the second sliding member, and the second clamping member is rotatably connected to the second sliding member. The second torsion spring connects to the second sliding member in one end and connects to the second clamping member in the other end.

According to yet another aspect, the clamping bracket further includes a first roller being rotatably connected to the first clamping member and facing one side of the second clamping member, and a second roller being rotatably connected to the second clamping member and facing one side of the first clamping member. The first roller's rotational axis is perpendicular to the first sliding member's moving direction and the second roller's rotational axis is perpendicular to the second sliding member's moving direction.

According to yet another aspect, the first roller includes a first roller axle rotatably connected to the first clamping member, and a first anti-slip member sleevingly connected to the first roller axle The second roller includes a second roller axle rotatably connected to the second clamping member, and a second anti-slip member sleevingly connected to the second roller axle.

According to yet another aspect, the clamping bracket further includes a docking mechanism being connected to the base casing for gripping onto external structures.

The invention allows the control of a controlling mechanism by an anchor mechanism. User uses a single hand to hold a mobile device, and the free fingers to push/pull the first anchor member to separate the first anchor member and the second anchor member from a plug-in position thereby switching the first anchor member to an unlock state. Since the first anchor member connects to the transmission member, the first anchor member causes the transmission member to move, which drives the first sliding member. As a result, the first clamping member moves toward the second clamping member for gripping a mobile device. User can maneuver locations of the first anchor member to move the transmission member thereby causing the first clamping member to move to a desired location. User may use fingers to push/pull the first anchor member to engage with the corresponding second anchor member; switching the first anchor member to a lock state. Once the first anchor member engages with the second anchor member, it stops the transmission member and the first clamping member. As a result, the distance adjustment between the first clamping member and the second clamping member is achieved to provide various width requirements for different mobile devices. The entire process is achieved single-handedly, and therefore no need of coordination of two hands, or electrical assistance. The clamping bracket provides adjustable clamping width, and it is cost effective and user friendly.

BRIEF DESCRIPTION OF THE DRAWINGS

These and other features, aspects, and advantages of the invention will be better understood with regard to the following description, appended claims, and accompanying drawings as follows:

Figure 1:
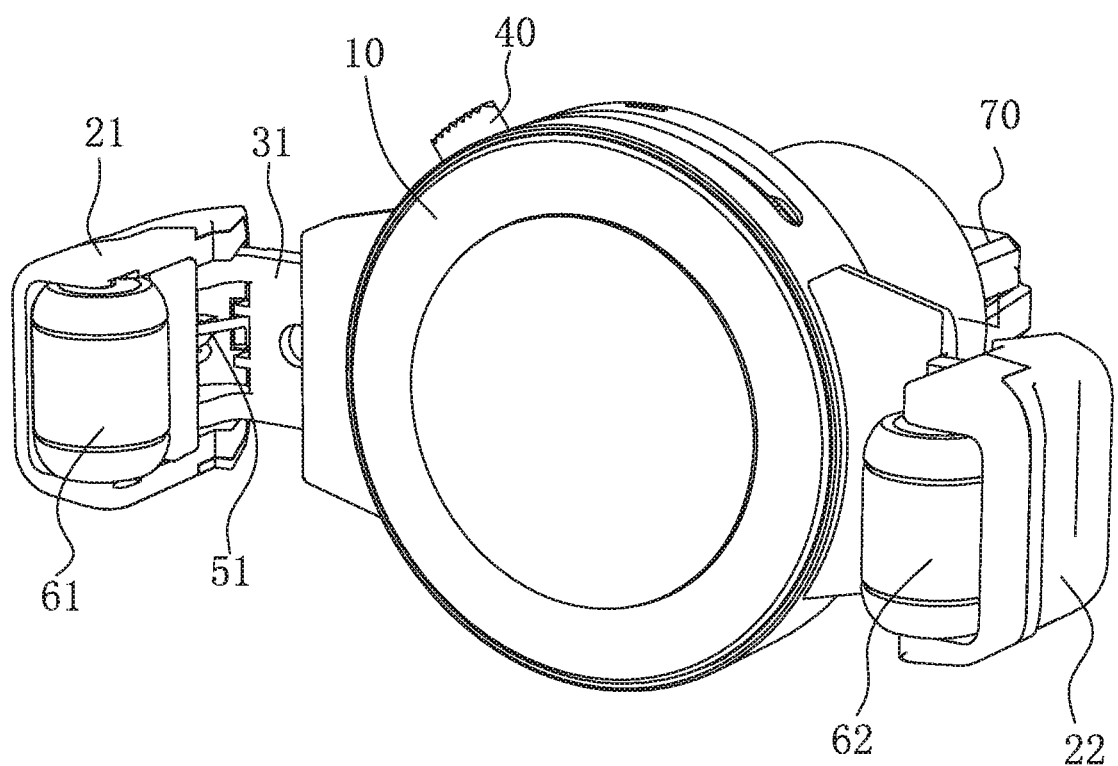
FIG. 1 is a perspective view depicting an example clamping bracket in accordance with one embodiment of the invention.

Descriptions for element labels in the drawings are as follows: 10: base casing, 11: top panel, 12: bottom panel, 13: side panel, 131: sliding member slot, 132: anchor mechanism control slot, 21: first clamping member, 22: second clamping member, 31: first sliding member, 311: first clamping gear rack, 32; second sliding member, 321: second clamping gear rack, 33: transmission member, 40: anchor mechanism, 41: first anchor member, 411: first anchor block, 412: first anchor gear rack, 42: second anchor member, 421: second anchor block, 422: second anchor gear rack, 43: connector, 44: elastomer, 51: first torsion spring, 52: second torsion spring, 61: first roller, 611: first roller axel, 612: first anti-slip member, 62: second roller, 621: second roller axel, 622: second anti-slip member, 70: docking mechanism.

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

In the description of this disclosure, it needs to be understood that the terms 'width', 'above', 'below', 'inside', 'outside', etc. position indicators are based on the drawings' position or relative location. It is used only for the convenience of describing the invention and to simplify the description; and not meant to refer to or to hint the indicated device or part required designated location, nor the designated location construct or operation. Therefore, it cannot be interpreted as a limitation.

Furthermore, the terms 'first' and 'second' are only used for the purpose of describing; and should not be interpreted as indicating or hinting of importance or implying the quantity of the indicated technical feature. Hence, it is defined that 'first' and 'second' express or imply that includes one or more of the same feature. In the description of this disclosure, 'a plurality of' means two or more, unless otherwise specified.

In this disclosure, unless otherwise specified, terms such as 'install', 'join', 'connect', 'fixed', etc. should be interpreted generally. For example, it can be fixed connection, or it can also be removable connection, or integrate as one; it can be mechanical connection, it also can be electrical connection; it can be direct connection, it can also be connection through medium; it can be two s connected internally, or two pieces connected through interaction.

To further bring out the objective, technology, and the advantage of the invention, example embodiments with detail descriptions are shown below.

According to one embodiment of the invention, a clamping bracket for holding mobile devices is disclosed. Mobile devices refer to movable devices, for example, mobile phone, tablet, electronic device, or other mechanical devices that can be clamped.

Figure 2:
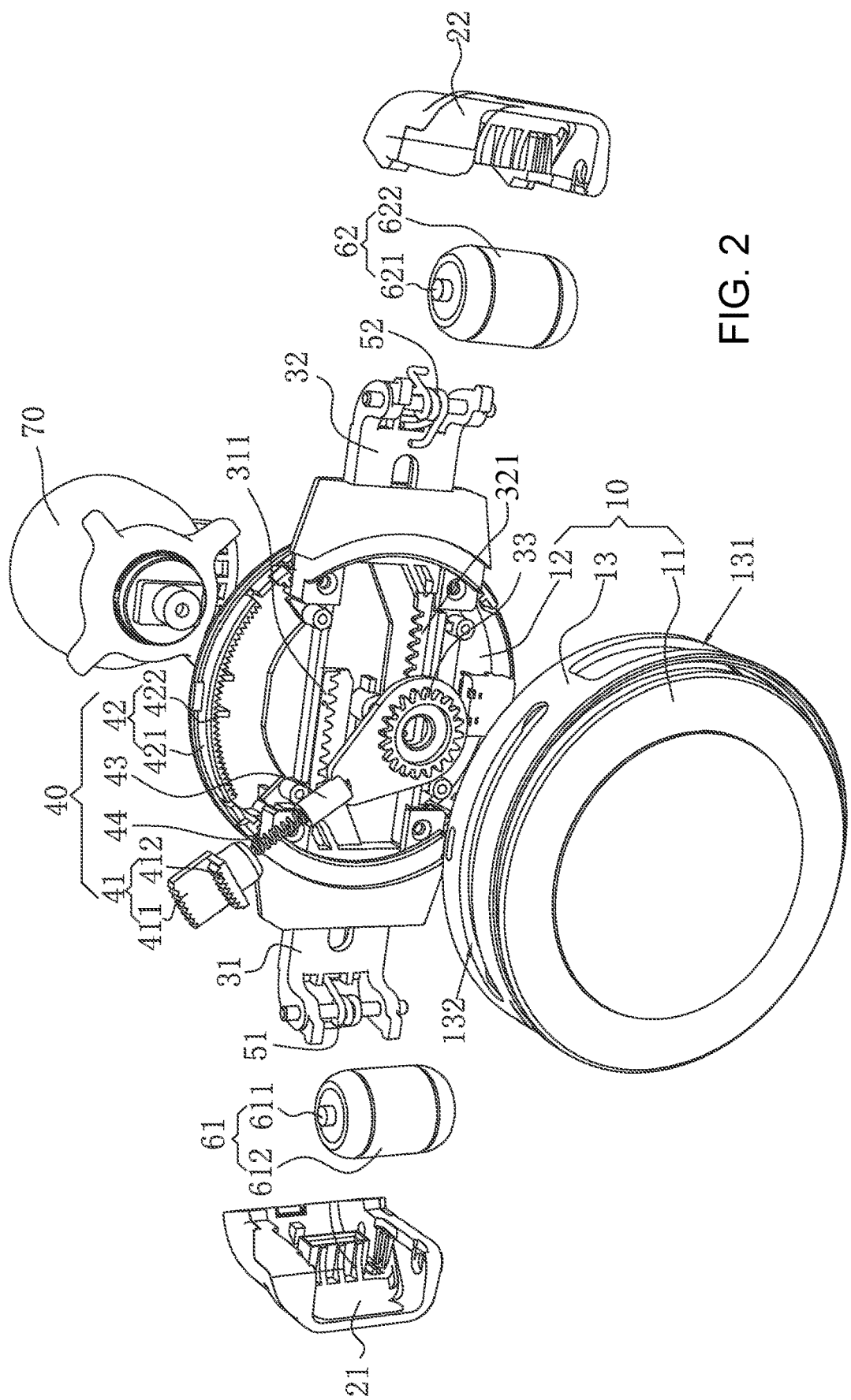
FIG. 2 is an exploded perspective view depicting an example clamping bracket in accordance with one embodiment of the invention.

Please refer to FIG. 1 and FIG. 2. In an example embodiment of the invention, a clamping bracket includes a base casing 10, a clamping mechanism, a controlling mechanism, and an anchor mechanism 40.

Please refer to FIG. 1 and FIG. 2. The clamping mechanism includes a first clamping member 21 and a second clamping member 22 located on opposite sides of the base casing 10, with the first and the second clamping members 21-22 sticking out from the respective sides of the base casing 10. The first clamping member 21 and the second clamping member 22 are designed for gripping a mobile device from opposite sides of the mobile device.

Please refer to FIG. 2. The controlling mechanism includes a first sliding member 31 and a transmission member 33. The first sliding member 31 connects to the first clamping member 21 and slidingly connects to the base casing 10. The transmission member 33 connects to the base casing 10. Through its own movement, the transmission member 33 is configured for moving the first sliding member 31, which causes the first clamping member 21 move toward the second clamping member 22 for gripping a mobile device; or move away from the second clamping member 22 for releasing the mobile device. In one embodiment, for easier manufacturing and simplified structure, the second clamping member 22 is fixedly connected to the base casing 10. In another embodiment, the second clamping member 22 is slidingly connected to the base casing 10 such that the first clamping member 21 and the second clamping member 22 move synchronously toward or away from each other for faster adjustment. The first clamping member 21 can move along a straight line aligned with the second clamping member 22, and also can move nonlinearly toward or away from the second clamping member 22.

Please refer to FIG. 1 and FIG. 2. The anchor mechanism 40 includes a first anchor member 41 connected to the transmission member 33 and a second anchor member 42 connected to the base casing 10. The first anchor member 41 is in an unlock state when separates from the second anchor member 42, and in a lock state when engages with the second anchor member 42. The second anchor member 42 has multiple different plug-in positions for the first anchor member 41 to engage with under lock state. When switching from lock state to unlock state, the first anchor member 41 disengages from a current plug-in position to drive the transmission member 33 to move the first clamping member 21. The first anchor member 41 becomes immobile, when switching from unlock state to lock state, thereby causing the transmission member 33 to stop movement of the first clamping member 21. After the first anchor member 41 engages with the second anchor member 42 in one of the plug-in positions, it restricts movements on the plane perpendicular to the plug-in direction. The first anchor member 41 may plug-in to a side of the second anchor member 42, opposite to the transmission member 33 or facing the transmission member 33. An ideal plug-in position is where it can restrict movement of the transmission member 33.

In one embodiment, the control of the controlling mechanism through the setup of the anchor mechanism 40 is achieved. User holds the mobile device single handedly, using the free fingers to push/pull the first anchor member 41, enabling the first anchor member 41 to separate from the second anchor member 42 from a current plug-in position, and switching the first anchor member 41 to an unlock state. Because the first anchor member 41 is connected to the transmission member 33, the first anchor member 41 causes the transmission member 33 to move through its own movement. The transmission member 33 then drives the first sliding member 31 to move the first clamping member 21 toward the second clamping member 22, hence gripping the mobile device. User can also move the mobile device to a desired location by pushing/pulling the first anchor member 41 to move the transmission member 33 to drive the first clamping member 21 to move to where is needed. User can again use fingers to push/pull the first anchor member 41 to engage with the second anchor member 42, switching the first anchor member 41 to a lock state. Once the plug-in position is set. The first anchor member 41 stops the transmission member 33 and the first clamping member 21, thus, making the distance between the first clamping member 21 and the second clamping member 22 fixed, achieving the distance adjustment between the first clamping member 21 and the second clamping member 22. Therefore the clamping bracket provides various width requirements for different mobile devices. The entire process is achieved single-handedly, and therefore no need of coordination of two hands, or electrical assistance. The clamping bracket provides adjustable clamping width, and it is cost effective and user friendly.

Please refer to FIG. 2. Furthermore, the controlling mechanism further includes a second sliding member 32 connected to the second clamping member 22 and slidingly connected to the base casing 10. Through the transmission member's own movement, the transmission member 33 drives the second sliding member 32 hence causing the second clamping member 22 to move toward or away from the first clamping member 21. Thus, the transmission member 33 can simultaneously or separately drive the first sliding member 31 and the second sliding member 32, causing the first clamping member 21 and the second clamping member 22 simultaneously move toward or away from each other, making it more efficient.

Please refer to FIG. 2. Furthermore, the transmission member 33 includes the big gear (e.g., pinon gear) that rotatably connects to the base casing 10. Located on one side of the first sliding member 31, there is a first clamping gear rack 311 having gear teeth meshed with the big gear. The first clamping gear rack 311 is straight. Through rotational motion, the big gear drives the first sliding member 31 to move toward or away from the second clamping member 22 thereby making the first clamping member 21 to move toward or away from the second clamping member 22. Located on one side of the second sliding member 32, there is a second clamping gear rack 321 having gear teeth meshed with the big gear. The second clamping gear rack 321 is straight. Through rotational motion, the big gear drives the second sliding member 32 to move toward or away from the first clamping member 21 thereby causing the second clamping member 22 to move toward or away from the first clamping member 21. Optimally, the first clamping gear rack 311 and the second clamping gear rack 321 are set up corresponding to each other. The big gear is so located between the first clamping gear rack 311 and the second clamping gear rack 321 that it simultaneously drives the first clamping gear rack 311 and the second clamping gear rack 321 to move in opposite directions. In the example embodiment shown in FIG. 2, the first sliding member 31 locates above the big gear, while the second sliding member 32 locates below the big gear. When the big gear rotates clockwise, it drives the first clamping gear rack 311 to move toward the second clamping member 22; at the same time, drives the second clamping gear rack 321 to move toward the first clamping member 21. That is, making the distance between the first clamping member 21 and the second clamping member 22 closer to each other. When the big gear rotates counter-clockwise, it drives the first clamping gear rack 311 to move away from the second clamping member 22; at the same time, drives the second clamping gear rack 321 to move away from the first clamping member 21. That is, making the distance between the first clamping member 21 and the second clamping member 22 further from each other.

Please refer to FIG. 2. Optimally, the anchor mechanism 40 further includes an elastomer 44 and a connector 43 connected to the big gear. The elastomer 44 connects to the connector 43 at one end and connects to the first anchor member 41 at the other end. The first anchor member 41 switches from lock state to unlock estate when the elastomer 44 is elastically deformed (i.e., pressed within the elastic limit). The first anchor member 41 switches from unlock state to lock state during elastic recovery of the elastically deformed elastomer 44. In one embodiment, the elastomer 44 is a spring. The connector 43 and the first anchor member 41 separately connects to either side of the elastomer. Optionally, under a lock state, the first anchor member 41 can be plugged into a side of the second anchor member 42 away from the big gear.

Pulling outward the first anchor member 41 causes the elastomer 44 to recover from the elastically deformed shape thereby disengaging the first anchor member 41 from a current plug-in position of the second anchor member 42. Hence, the first anchor member 41 switches from lock state to unlock state. Releasing the first anchor member 41, the elastic recovery of the elastomer 44 causes the first anchor member 41 to recoil, thus, moving toward the second anchor member 42, until it engages with the second anchor member 42. Hence, the first anchor member 41 switches from unlock state to lock state. Optimally, under a lock state, the first anchor member 41 can be plugged into a side of the second anchor member 42 closer to the big gear.

Pressing inward the first anchor member 41 causes the elastomer 44 to compress hence disengaging the first anchor member 41 from the second anchor member 42. Hence, the first anchor member 41 switches from lock state to unlock state. Releasing the first anchor member 41, the elastic recovery of the elastomer 44 causes the first anchor member 41 to stretch out, thus, moving toward the second anchor member 42, until it engages with the second anchor member 42. Hence, the first anchor member 41 switches from unlock state to lock state.

Please refer to FIG. 2. Specifically, the first anchor member 41 includes at least a first anchor block 411 connected to the elastomer 44, and a first anchor gear rack 412 connected to the first anchor block 411. The second anchor member 42 includes at least a second anchor block 421 connected to the base casing 10, and a second anchor gear rack 422 connected to the second anchor block 421, The first anchor gear rack 412 and the second anchor gear rack 422 are correspondingly set up thereby achieving plug-in positions via meshed gear teeth. By pulling or pressing the first anchor block 411, user controls joining or separation of the first anchor gear rack 412 and the second anchor gear rack 422, avoiding the inconvenience of direct control. Optimally, the length of the second anchor gear rack 422 is longer than the length of the first anchor gear rack 412.

The first anchor gear rack 412 has multiple plug-in positions hence allowing the first anchor member 41 capable of plugging into the second anchor member 42 at any point within its moving range. As a result, the first anchor gear rack 412 provides adjustment and anchoring of the transmission member 33. Optimally, the first anchor block 411 is slidingly connected to the base casing 10 capable of moving toward or away from the elastomer 44. The first anchor block 411 slides on its sliding path to adjust the big gear's rotating range. The first anchor block 411 is configured for moving toward or away from the elastomer 44, hence, it can compress and then release the elastomer 44, or, stretch an then release the elastomer 44, enabling the first anchor member 41 to switch between unlock state and lock state.

Optimally, a mounting slot is located on a side of the first anchor block 411 facing the elastomer 44. The elastomer 44 locates inside the mounting slot. The connector 43 is inserted into the mounting slot, that is, the first anchor block 411 connects to the connector 43 with a sleeve joint. The connector 43 guides the first anchor block 411 when it moves toward or away from the elastomer 44, preventing the first anchor member 411 from veering off intended path. Optimally, the first anchor block 411 has an anti-slip portion for slippery prevention. The anti-slip portion has a rough surface. In one embodiment, the anti-slip portion contains a surface with zigzag pattern.

Please refer to FIG. 2. Particularly, the base casing 10 includes a top panel 11, a bottom panel 12 corresponding to the top panel 11, and a side panel 13 for connecting the top panel 11 and the bottom panel 12. The top panel 11, the bottom panel 12, and the side panel 13 together form a cavity. The transmission member 33 locates inside the cavity. The side panel 13 has two correspondingly set up sliding member slots 131, and an anchor mechanism control slot 132 located between the two sliding members 131. The first sliding member 31 and the second sliding member 32 are configured for separately piercing through the pair of sliding member slots 131. The first anchor member 41 is configured for piercing through the anchor member control slot 132 and for sliding along the anchor member control slot 132 under the unlock state. The top panel 11 is configured for a mobile device to lean against, and for limiting the location of a mobile device. In one example embodiment, the top panel 11 and the bottom panel 12 are of circular shape. The anchor mechanism control slot 132 is configured for providing the movement path of the first anchor member 41. The first anchor member 41 moves toward or away from the big gear on its movement path switches the state from unlock to lock or vice versa. The sliding member slots 131 are configured for guiding and supporting for the first sliding member 31 and the second sliding member 32.

Please refer to FIG. 2. Specifically, the first anchor gear rack 412 has a first joining surface for engaging with the second anchor gear rack 422. The second anchor gear rack 422 has a second joining surface for engaging with the first anchor gear rack 412. The second anchor gear rack 422 connects to the side of the side panel 13 that is facing the cavity with the second joining surface facing inside. The first anchor gear rack 412 is convexly located on one side of the first anchor member 411 with the first joining surface facing the second anchor gear rack 422. So that, the first anchor member 41 can switch from lock state to unlock state when the elastomer 44 is compressed; and from unlock state to lock state when the elastomer 44 is released.

Please refer to FIG. 1 and FIG. 2. Furthermore, the clamping bracket further includes a first torsion spring 51 that connects to the first sliding member 31, a second torsion spring 52 that connects to the second sliding member 32, a first roller 61 that rotatably connects to the first clamping member 21 and facing the second clamping member 22, and a second roller 62 that rotatably connects to the second clamping member 22 and facing the first clamping member 21.

Among them, the first clamping member 21 rotatably connects to the first sliding member 31. One end of the first torsion spring 51 connects to the first sliding member 31 and the other end connects to the first clamping member 21. The second clamping member 22 rotatably connects to the second sliding member 32. One end of the second torsion spring 52 connects to the second sliding member 32 and the other end connects to the second clamping member 22.

The first torsion spring 51 limits the movement of the first clamping member 21. When disengaged, an angle between the first clamping member 21 and the first sliding member 31 is maintained due to the first torsion spring 51. When a mobile device is clamped between the first clamping member 21 and the second clamping member 22, the distance between the two clamping members can be adjusted to a little bit smaller than the width of the mobile device. During the clamping process, the first clamping member 21 extends hence straining the first torsion spring 51 with spring restoring force to cause the mobile device to be tightly clamped between the first clamping member 21 and the second clamping member 22. Operating procedure and principle of the second torsion spring 52 are the same as those of the first torsion spring 51. User first adjusts the distance between the first clamping member 21 and the second clamping member 22, then pushes the mobile device into the space in between. A tight grip of the mobile device is achieved through the combined spring restoring force of the first torsion spring 51 and the second torsion spring 52.

Please refer to FIG. 1 and FIG. 2. Specifically, the extension direction of the rotational axis of the first roller 61 is perpendicular to the moving direction of the first sliding member 31. The extension direction of the rotational axis of the second roller 62 is perpendicular to the moving direction of the second sliding member 32. As a result, the mobile device can be pushed or pulled in a direction substantially perpendicular to and from the top panel 11 between the first clamping member 21 and the second clamping member 22. The first roller 61 and the second roller 62 can rotate as the mobile device moves, reducing wear between the mobile device and the first clamping member 21 and/or the second clamping member 22, as well as minimizing the friction between the mobile device and the clamping bracket.

Please refer to FIG. 2. Optimally, the first roller 61 includes a first roller axle 611 rotatably connected to the first clamping member 21, and a first anti-slip member 612 sleevingly connected to the first roller axle 611. The second roller 62 includes a second roller axle 621 rotatably connected to the second clamping member 22, and a second anti-slip member 622 that sleevingly connected to the second roller axle 621. The first anti-slip member 612 is configured for preventing slippage and enabling the first roller 61 to rotate as the mobile device moves, hence reducing wear.

Please refer to FIG. 1 and FIG. 2. Furthermore, the clamping bracket further includes a docking mechanism 70 that connects to the base casing 10, and is used for connecting to external devices. The docking mechanism 70 is for gripping on to external devices. External devices can be the inside structure of a car, or other structures that needs mobile devices be fixated.

The above are only some better example embodiments for the invention. They are not used to limit the scope of the invention. Any modifications, equivalent substitutions, or improvements based on the principle of this invention should all be included by the scope of protection.

I claim:

1. A clamping bracket for holding mobile devices comprising:
    a base casing;
    a clamping mechanism including first and second clamping members located on opposite sides of the base casing with the first and the second clamping members sticking out from the respective sides of the base casing;
    a controlling mechanism including a first sliding member connected to the first clamping member and slidingly connected to the base casing, and a transmission member connected to the base casing; and through the transmission member's own movement, the transmission member drives the first sliding member causing the first clamping member to move toward the second clamping member for gripping a mobile device or to move away from the second clamping member for releasing the mobile device; and
    an anchor mechanism including:
        a first anchor member connected to the transmission member and a second anchor member connected to the base casing, the first anchor member being in an unlock state when separating from the second anchor member, and the first anchor member being in a lock state when engaging with the second anchor member, the second anchor member containing a plurality of plug-in positions for the first anchor member to engage with; whereby the first anchor member, when switching from the lock state to the unlock state, disengages from a current plug-in position to drive the transmission member to move the first clamping member, and whereby the first anchor member, when switching from the unlock state to the lock state, becomes immobile thereby causing the transmission member to stop the first clamping member; and
        an elastomer and a connector connected to the transmission member, the elastomer being connected to the connector in one end and connected to the first anchor member in other end, such that the first anchor member is switched from the lock state to the unlock state during an elastic expansion of the elastomer, and the first anchor member is switched from the unlock state to the lock state during an elastic recovery of the elastomer from the elastic expansion.

2. The clamping bracket of claim 1, wherein the controlling mechanism further comprises a second sliding member connected to the second clamping member and slidingly connected to the base casing, and through the transmission member's own movement, the transmission member drives the second sliding member causing the second clamping member to move toward or away from the first clamping member.

3. The clamping bracket of claim 2, wherein the transmission member includes a big gear rotatably connected to the base casing, and wherein a first clamping gear rack located on one side of the first sliding member contains gear teeth meshed with the big gear.

4. The clamping bracket of claim 3, wherein a second clamping gear rack located on one side of the second sliding member contains gear teeth meshed with the big gear, and wherein the first clamping gear rack and the second clamping gear rack are correspondingly set up such that the big gear located therebetween is configured for moving the first clamping gear rack and the second clamping gear rack in opposite directions.

5. A clamping bracket for holding mobile devices comprising:
   a base casing;
   a clamping mechanism including first and second clamping members located on opposite sides of the base casing with the first and the second clamping members sticking out from the respective sides of the base casing;
   a controlling mechanism including:
      a first sliding member connected to the first clamping member and slidingly connected to the base casing, and a transmission member connected to the base casing; and through the transmission member's own movement, the transmission member drives the first sliding member causing the first clamping member to move toward the second clamping member for gripping a mobile device or to move away from the second clamping member for releasing the mobile device, wherein the transmission member includes a big gear rotatably connected to the base casing, and wherein a first clamping gear rack located on one side of the first sliding member contains gear teeth meshed with the big gear; and
      a second sliding member connected to the second clamping member and slidingly connected to the base casing, and through the transmission member's own movement, the transmission member drives the second sliding member causing the second clamping member to move toward or away from the first clamping member, wherein a second clamping gear rack located on one side of the second sliding member contains gear teeth meshed with the big gear, and wherein the first clamping gear rack and the second clamping gear rack are correspondingly set up such that the big gear located therebetween is configured for moving the first clamping gear rack and the second clamping gear rack in opposite directions; and
   an anchor mechanism including:
      a first anchor member connected to the transmission member and a second anchor member connected to the base casing, the first anchor member being in an unlock state when separating from the second anchor member, and the first anchor member being in a lock state when engaging with the second anchor member, the second anchor member containing a plurality of plug-in positions for the first anchor member to engage with; whereby the first anchor member, when switching from the lock state to the unlock state, disengages from a current plug-in position to drive the transmission member to move the first clamping member, and whereby the first anchor member, when switching from the unlock state to the lock state, becomes immobile thereby causing the transmission member to stop the first clamping member; and
      an elastomer and a connector connected to the transmission member, the elastomer being connected to the connector in one end and connected to the first anchor member in other end, such that the first anchor member is switched from the lock state to the unlock state during an elastic expansion of the elastomer, and the first anchor member is switched from the unlock state to the lock state during an elastic recovery of the elastomer from the elastic expansion.

6. The clamping bracket of claim 5, wherein the first anchor member comprises a first anchor gear rack and a first anchor block connected to the elastomer, and wherein the second anchor member comprises a second anchor gear rack having gear teeth meshed with the first anchor gear rack.

7. The clamping bracket of claim 6, wherein the first anchor block is connected to the base casing with a sleeve joint and is configured for moving toward or away from the elastomer.

8. The clamping bracket of claim 6, wherein the first anchor block includes an anti-slip mechanism for slippery prevention.

9. The clamping bracket of claim 6, wherein the base casing comprises a top panel, a bottom panel, and a side panel for connecting the top panel and the bottom panel, the top panel, the bottom panel, and the side panel together forming a cavity, the transmission member being located inside the cavity, the side panel having a pair of sliding member slots that correspond to each other, and an anchor member control slot located between the sliding member slots, the first sliding member and the second sliding member being configured for piercing through the respective sliding member slots, the first anchor member being configured for piercing through the anchor member control slot, and for sliding along the anchor member control slot under the unlock state.

10. The clamping bracket of claim 9, wherein the first anchor gear rack has a first joining surface for engaging with the second anchor gear rack, the second anchor gear rack has the second joining surface for engaging with the first anchor gear rack, the second anchor gear rack being connected to the side panel toward the cavity with the second joining surface facing inside, the first anchor gear rack being convexly located on one side of the first anchor member with the first joining surface facing the second anchor gear rack.

11. The clamping bracket of claim 10, further comprises a first torsion spring connected to the first sliding member, and the first clamping member being rotatably connected to the first sliding member, wherein the first torsion spring connects to the first sliding member in one end and connects to the first clamping member in other end.

12. The clamping bracket of claim 11, further comprises a second torsion spring connected to the second sliding member, the second clamping member being rotatably connected to the second sliding member, wherein the second torsion spring connects to the second sliding member in one end and connects to the second clamping member in other end.

13. The clamping bracket of claim 12, further comprises a first roller being rotatably connected to the first clamping member and facing one side of the second clamping member, and a second roller being rotatably connected to the second clamping member and facing one side of the first clamping member, wherein the first roller's rotational axis is perpendicular to the first sliding member's moving direction and the second roller's rotational axis is perpendicular to the second sliding member's moving direction.

14. The clamping bracket of claim 13, wherein the first roller includes a first roller axle rotatably connected to the first clamping member, and a first anti-slip member sleevingly connected to the first roller axle, and wherein the second roller includes a second roller axle rotatably connected to the second clamping member, and a second anti-slip member sleevingly connected to the second roller axle.

15. The clamping bracket of claim 1, further comprises a docking mechanism being connected to the base casing for gripping onto external structures.

16. A clamping bracket for holding an object comprising:
- a base casing;
- first and second clamping members located on either side of the base casing for clamping the object;
- a controlling mechanism connected to the base casing, and the first and the second clamping members, the controlling mechanism causing the first clamping member and the second clamping member either to move toward each other or to move away from each other; and
- an anchor mechanism having:
  - a first anchor member connected to the controlling mechanism, and a second anchor member connected to the base casing, the first anchor member being configured for engaging the second anchor member at one of a plurality of plug-in positions in the second anchor member; and
  - an elastomer and a connector, the elastomer being connected to the connector in one end and connected to the first anchor member in other end, such that the first anchor member is switched from a lock state to an unlock state during an elastic expansion of the elastomer, and the first anchor member is switched from the unlock state to the lock state during an elastic recovery of the elastomer from the elastic expansion.

* * * * *